United States Patent [19]

Sedlmeyer

[11] Patent Number: 5,638,451
[45] Date of Patent: Jun. 10, 1997

[54] TRANSMISSION AND STORAGE OF MULTI-CHANNEL AUDIO-SIGNALS WHEN USING BIT RATE-REDUCING CODING METHODS

[75] Inventor: Robert Sedlmeyer, Ismaning, Germany

[73] Assignee: Institut fuer Rundfunktechnik GmbH, Munich, Germany

[21] Appl. No.: 362,521

[22] PCT Filed: Jun. 22, 1993

[86] PCT No.: PCT/EP93/01582

§ 371 Date: Jan. 5, 1995

§ 102(e) Date: Jan. 5, 1995

[87] PCT Pub. No.: WO94/01980

PCT Pub. Date: Jan. 20, 1994

[30] Foreign Application Priority Data

Jul. 10, 1992 [DE] Germany ............... 42 22 623.6

[51] Int. Cl.$^6$ ........................................... H04H 5/00
[52] U.S. Cl. ................... 381/2; 381/18; 395/2.38
[58] Field of Search ........................ 381/2, 94, 18; 395/2.38

[56] References Cited

U.S. PATENT DOCUMENTS 5,285,498  2/1994  Johnston ........................ 381/2

FOREIGN PATENT DOCUMENTS 0402973  12/1990  European Pat. Off. .
3639753  9/1988  Germany .

OTHER PUBLICATIONS

Warner R. Th.: "Eine Neue Codiertechnik für Surround-Stereo-Surround (4-2-4)". In: Rundfunktechnische Mitteilungen, vol. 35, No. 1, Jan. 1991, Norderstedt, DE, pp. 10-16.

W.R. Th. ten Kate et al.: "Matrixing of Bit Rate Reduced Audio Signals". IN: IEEE International Conference on Acoustics, Speech and Signal Processing, vol. 2, Mar. 23, 1992, San Francisco, US, pp.205-208.

Suganami et al.: "A sound Reproduction and Transmission System for HDTV". In: Fourth International Colloquium on Advanced Television Systems, Jun. 25, 1990, Ottawa, CA, pp. 3A.7.2-3A.7.14.

Johnston et al.: "Sum-Difference Stereo Transform Coding" In: IEEE International conference on Acoustics, Speech and Signal Processing, vol. 2, Mar. 23, 1992, San Francisco, US, pp. 569-572.

James Johnston: "Perceptual Transform Coding of Wideband Stereo Signals". In: IEEE International Conference on Acoustics, Speech and Signal Processing, vol. 3, May 23, 1989, Glasgow, GB, pp. 1993-1996.

*Primary Examiner*—Forester W. Isen
*Attorney, Agent, or Firm*—Spencer & Frank

[57] ABSTRACT

In order to require only a relatively small increase in the data rate when the number of channels of multi-channel digitalized and bit-rate reduced audio signals is increased, the psychoacoustic concealment or masking by at least part of the remaining audio channels or the redundancy of individual audio channels is taken advantage of in each individual audio channel when reducing the bit rate of audio signals having more than two audio channels. Only those parts of the concerned audio channel are transmitted or stored which are not concealed by the audio signals of other audio channels or which are contained in the audio channels for stereophonic reproduction with all types of reproduction available for selection. In addition, the used parts are transmitted or stored with a resolution only big enough for the totality of all audio channels to keep concealed the quantization noise generated during quantization in all types of reproduction available for selection.

8 Claims, 5 Drawing Sheets

TRANSMISSION AND STORAGE OF MULTI-CHANNEL AUDIO-SIGNALS WHEN USING BIT RATE-REDUCING CODING METHODS

BACKGROUND OF THE INVENTION

For the transmission and storage of audio signals in digital form, different coding methods for achieving bit rate reduction have become known so far (DE 3639753 C2) which are used for the coding of a monophonic or stereophonic audio channel. If the bit rate of two audio channels that belong together is to be reduced, each individual channel by itself can be subjected to a bit rate-reducing coding and can subsequently be transmitted or stored. The bit rate reduction, however, can be made more effective by not only utilizing the masking characteristics of the human ear in each individual audio channel taken by itself for the bit rate reduction but, in addition, by also utilizing the inertia of the hearing sensation in stereophonic hearing as well as the stereophonic masking characteristics of the human ear (NL 9000338).

For some applications (such as, for example, for future HDTV applications), however, it is intended to transmit, record or reproduce more audio channels of a multi-channel signal than the usual two (stereophonic) used so far. Naturally, in such a case all audio channels can be individually subjected to a bit rate-reducing coding before they are transmitted or stored. Nevertheless, the bit rate necessary for the transmission of multi-channel audio signals increases along with the number of channels that are to be transmitted. Because of the very high costs for the additionally required channel capacity compared to stereophonic transmission, this circumstance does not result in an easy implementation of such a multi-channel transmission method.

SUMMARY OF THE INVENTION

It is the object of the invention to create a method which necessitates only a relatively small increase in the data rate when the number of channels is expanded.

This object is solved, according to the invention, in that for the bit rate reduction of audio signals having more than two audio channels, the psychoacoustic masking by at least a portion of the remaining audio channels or the redundancy of individual audio channels among themselves is utilized for each individual audio channel, to the effect that only those portions of the considered audio channel are transmitted or stored that, in the reproduction types or modes that can be selected from, are not masked by the audio signals of other audio channels or are contained in the audio channels for stereophonic reproduction, and the used portions are transmitted or stored with such a low resolution that, in the reproduction types or modes that can be selected from, the quantization noise generated by quantization remains masked by the totality of all audio channels.

Advantageous modifications and developments of the method according to the invention ensure compatibility with existing systems.

The invention is based on the consideration that when the number of channels to be transmitted is expanded to more than only two audio channels, the masking characteristics of the human ear should still be utilized further for the coding of these audio channels beyond the masking characteristics in the individual channel or stereo channel. In this process, the masking by all other audio signals can be utilized for each individual audio channel of the audio channels to be transmitted or stored.

By means of such a procedure, the data rate for the transmission of the additional audio channels that exceed the two base audio channels of a stereo signal that are normally to be transmitted, can be considerably reduced if suitable coding is used.

For these additional audio channels only those portions of the respective audio signals are then transmitted that are not masked by the audio signals of other audio channels, and these portions are only transmitted with such a low resolution and thus also data rate that the quantization noise generated by quantization remains masked.

If a sub-band coding method is used, the portions to be transmitted can be separated from the portions that are not to be transmitted by deciding on a sub-band basis, while sorting out can take place based on the individual spectral lines when a transform coding method is applied.

BRIEF DESCRIPTION OF THE DRAWINGS

In the following, the invention is described in greater detail by way of the embodiments illustrated in the drawings. These show.

DESCRIPTION OF THE PREFERRED EMBODIMENTS

Figure 1:
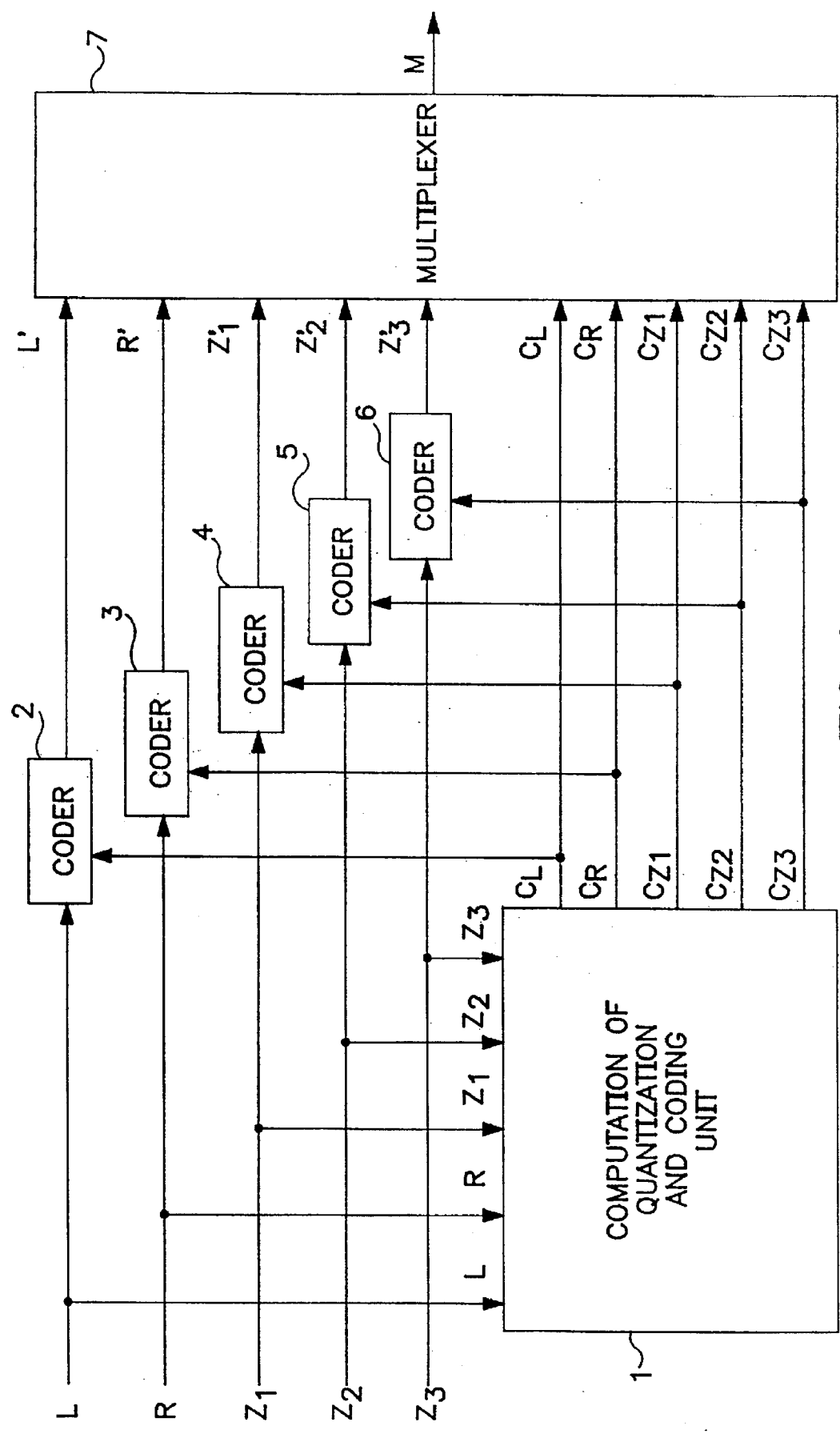
FIG. 1 is a block diagram of a source coder for multi-channel audio signals for the implementation of the method according to the invention on the source side.

By way of example, FIG. 1 shows a block diagram of a source coder according to the invention for five audio channels L, R, Z1, Z2 and Z3. The two audio signals L and R of a stereophonic audio signal as well as the audio signals Z1, Z2 and Z3, which are to be transmitted in addition, are examined in a unit 1, on the basis of psychoacoustic principles, as to their reciprocal spectral and level-related masked threshold, whereby a respective coding rule CL, CR, CZ1, CZ2 and CZ3 is obtained for each individual audio signal. These coding rules are passed on to coders 2 . . . 6, which are thus able to code the respective audio signals L, R, Z1, Z2 and Z3. During coding, the coded and data rate-reduced audio signals L', R', Z1', Z2' and Z3' are generated which now only contain those signal portions that are necessary during the reproduction in spite of reciprocal masking. Usually, a multiplexer 7 then turns these coded signals into a multiplex signal M which is suited for the transmission, during which process the coding rules CL, CR, CZ1, CZ2 and CZ3 are also used by the multiplexer 7.

Figure 2:
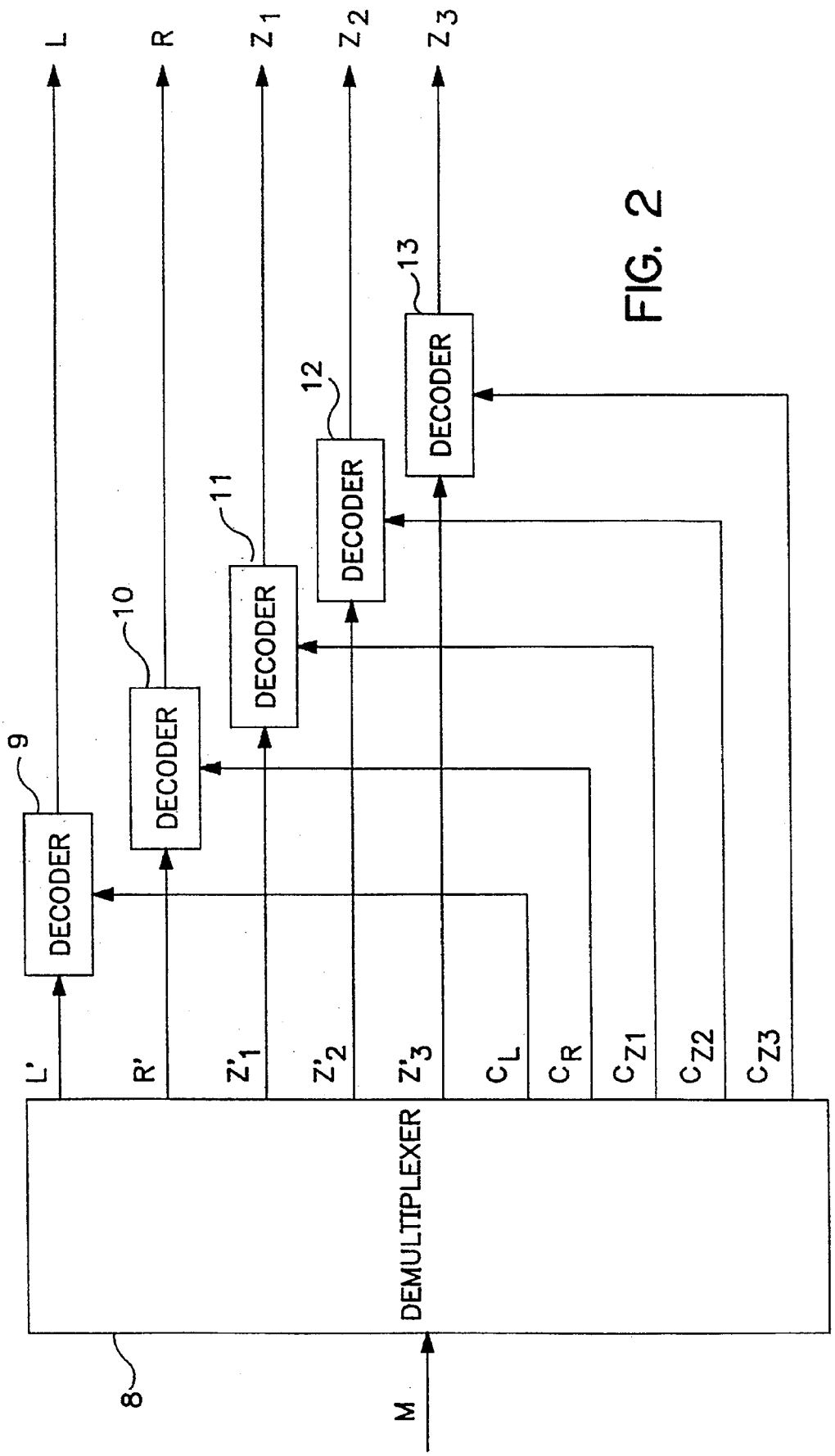
FIG. 2 is a block diagram of a source decoder for multi-channel audio signals for the implementation of the method according to the invention on the sink side.

FIG. 2 shows a block diagram of a source decoder according to the invention. The transmitted or stored multiplex signal M from the multiplexer 7 of FIG. 1 is divided in the demultiplexer 8 into the coded audio signals L', R', Z1', Z2', Z3' and the coding rules CL, CR, CZ1, CZ2 and CZ3. Then, the subsequent decoders 9 . . . 13 reconstruct the original audio signals L, R, Z1, Z2 and Z3 by using the associated coding rules.

The following is intended to consider the compatibility with monophonic and stereophonic coding methods in greater detail.

In practice, monophonic and stereophonic transmissions with different coding methods are already applied. For digital audio broadcasting (Digital Audio Broadcasting, and in short, DAB), CCIR is presently standardizing, inter alia, a source coding rule for monophonic and stereophonic audio signals.

A coding method that is intended to serve the transmission and storage of multi-channel audio signals having more than two audio channels must thus, in many cases, be compatible with already existing methods. This leads to situations where a multi-channel audio signal that has been sent out must be processable at the receiving point with both existing stereophonic digital decoders as well as possible multi-channel decoders. Furthermore, it must be possible to reproduce such a signal with the usual stereophonic and thus two-channel loudspeaker configuration as well as with more loudspeakers. The following example is intended to illustrate this in greater detail.

In a multi-channel source signal, there are several additional audio channels Z1, Z2 and Z3, apart from a left channel (L) and a right channel (R), e.g., a center channel, a rear left channel and a rear right channel. The two rear channels frequently contain space information as well as effect information. In a stereophonic source signal, on the other hand, such space and effect information—generally all signals—is contained in any ratio in the LO and RO channels existing by themselves. During a stereophonic reproduction, only these two channels (LO and RO) can be reproduced.

Figure 3:
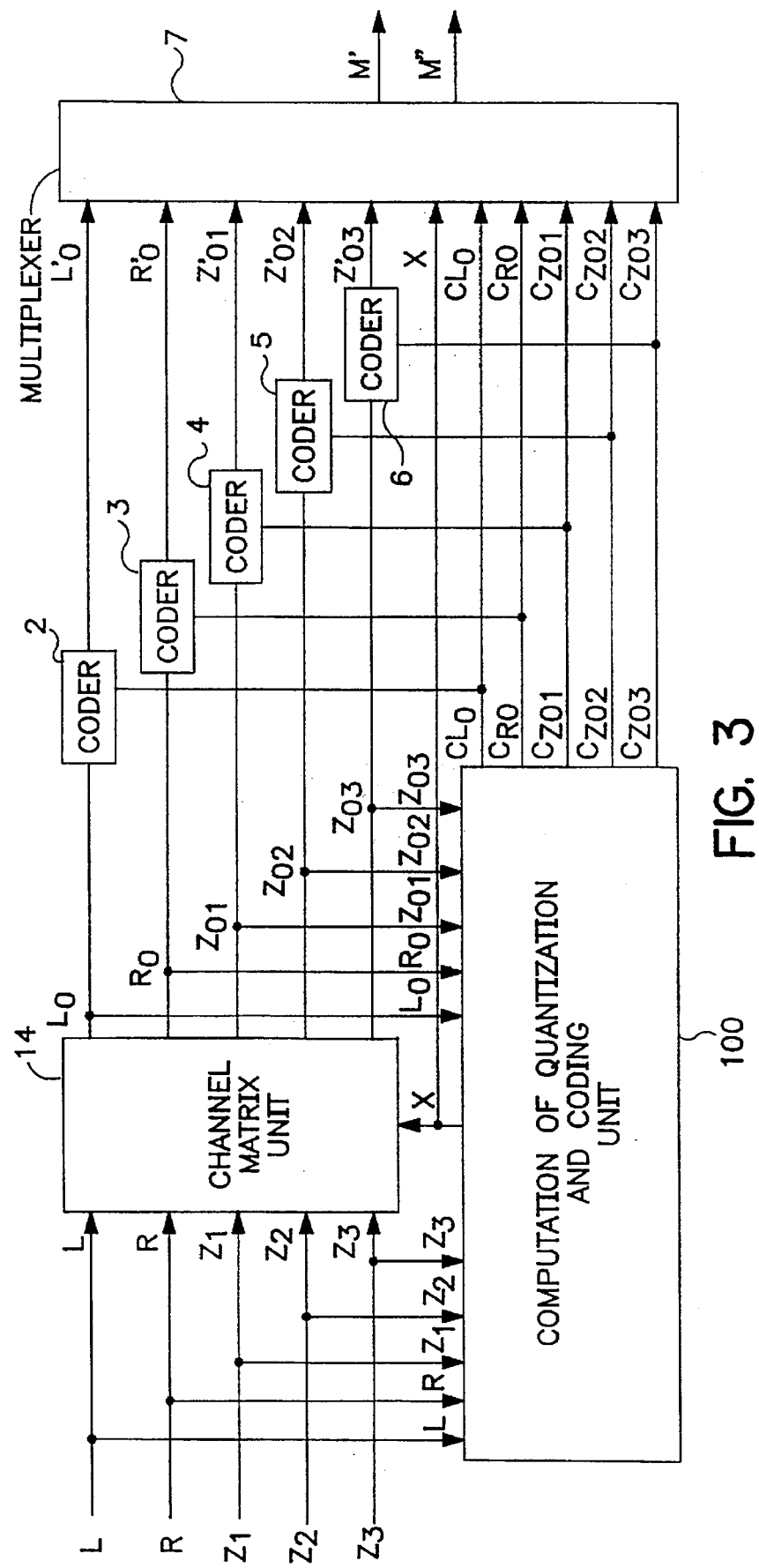
FIG. 3 is a block diagram of a further source coder for multi-channel audio signals for the implementation of the method according to the invention on the source side, with the source-coded audio signals being decodable by already existing stereophonic source decoders working according to known methods.
Figure 4:
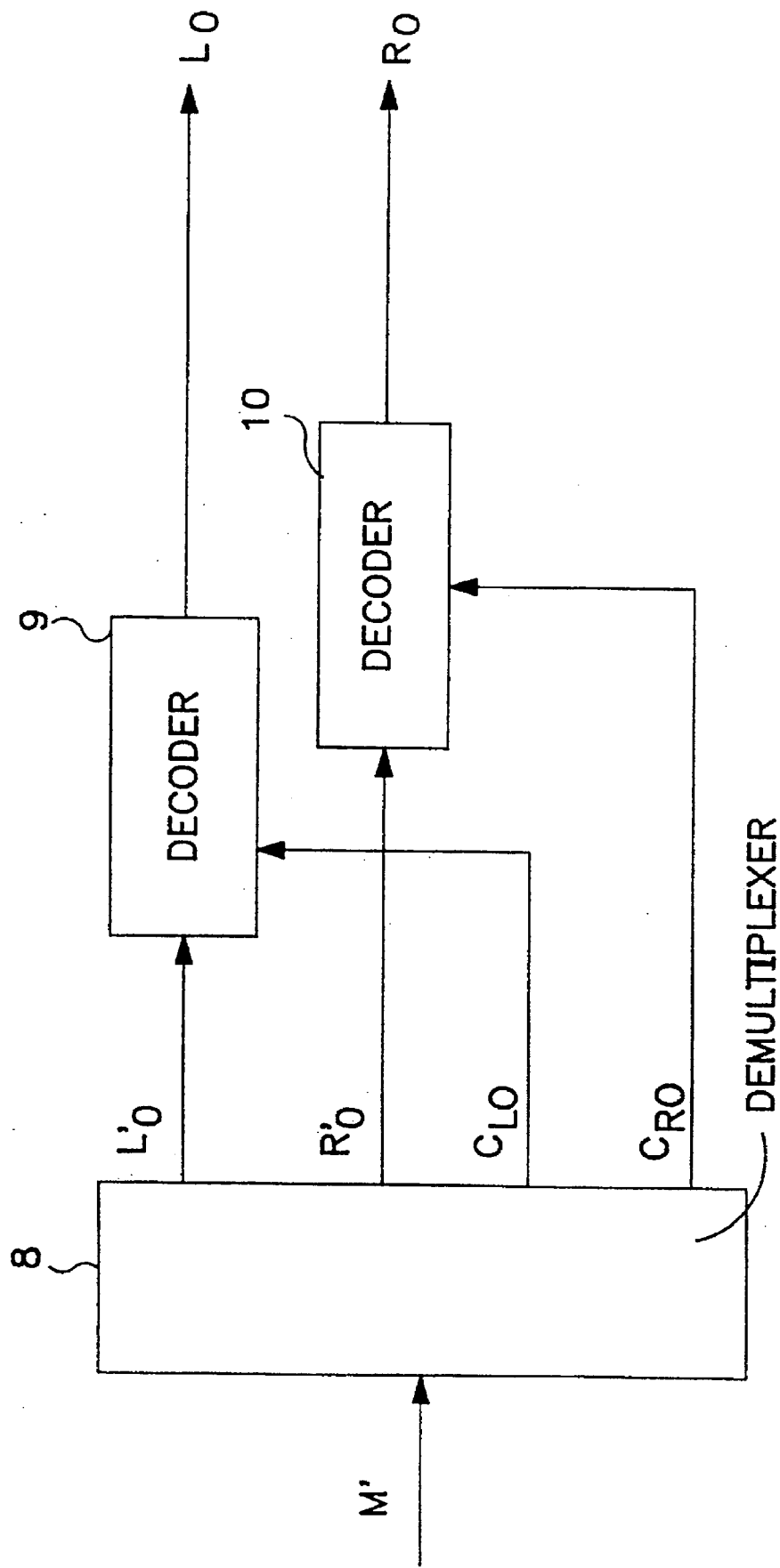
FIG. 4 is a block diagram of a known stereophonic source decoder which is suited for compatible stereophonic decoding of the multi-channel audio signals coded by the source coder according to FIG. 3.

In order to achieve compatibility between the multi-channel and stereophonic technique, a stereo-compatible, multi-channel source coder can be used for the coding of multi-channel audio signals, such as the one shown in FIG. 3. A new feature, as opposed to FIG. 1, is a channel matrix unit 14 within which the additional audio channels Z1, Z2 and Z3 are assigned to the two base channels L and R in an appropriate manner to obtain the audio signals LO and RO which correspond to a normal stereophonic audio signal. Later, this signal can be reproduced at the receiving point, e.g., with two loudspeakers, by means of only a stereophonic source decoder, as is shown in FIG. 4 by way of example, with the reproduced audio signals LO and RO containing not only the audio signals L and R but also the additional audio signals Z1, Z2 and Z3 in an appropriate form. A multi-channel reproduction can also take place with the assistance of a stereo-compatible, multi-channel source decoder (FIG. 5) as will be explained later.

For the computation of the quantization rules and coding rules CLO, CRO, CZ01, CZ02 and CZ03 in unit 100, as opposed to unit 1 in FIG. 1, a determination can take place in the stereo-compatible, multi-channel source coder according to FIG. 3 of not only the masking which the audio channels L, R, Z1, Z2 and Z3 exert on each one of these audio channels when all audio channels are reproduced simultaneously but also of the masking which each of the two audio channels LO and RO exerts on the respective other channel, namely for the case where only a two-channel stereophonic reproduction of the audio signals LO and RO takes place for the reproduction of the sound signals. For the final computation of the coding rules CLO and CRO for the coding of the audio signals LO and RO, the respective lesser masking effect can then be taken as a base, whereby for both the case of multi-channel reproduction and the case of stereophonic reproduction a sufficient quantization can be ensured.

In the channel matrix unit 14 of the multi-channel source encoder according to FIG. 3, it is possible to not only form the signal content of the audio signals LO and RO from the input signals L, R, Z1, Z2 and Z3 by means of matrixing, as described above, but the audio signal content of the additional audio channels Z1, Z2 and Z3 can also be matrixed at will among themselves as well as with the audio signals L and R. For this purpose, the type of matrixing that is to be respectively used in the channel matrix 14 is determined in unit 100 of the multi-channel source encoder in FIG. 3. In the following, it is intended to explain the determination of a suitable matrixing by using the example of a center channel Z1.

Such a center channel Z1 might be formed from the sum of the signal portions L, R and Mi according to the formula KL* L+KR*R+Mi, wherein the signals L and R are also present as input signals of the channel matrix 14, while Mi represents an additional center signal portion. KR and KL are weighting factors and possibly phase shifts or time shifts. In order to reduce the data volume that is to be coded in the audio signal Z01, a matrixing can take place in this case in the channel matrix 14 in such a way that the signal portions L and R that are still contained in the signal Z1 are removed from the audio signal Z01, which means that the audio signal Z01 that is to be coded then only consists of the center signal portion Mi and can be coded in the coder 4 with a data rate that is smaller than if the signal Z1 would have been coded directly.

A matrixing that is suitable for this purpose can be found in unit 100 based on the examination of the input signals L, R, Z1, Z2 and Z3 and can be passed on as matrixing instruction X to both the channel matrix unit 14 and to the multiplexer 7. In the multiplexer 7, either all signals that are to be transmitted can be put together to form one common multiplex signal or, depending on compatibility requirements, several multiplex signals. In the example of the stereo-compatible, multi-channel source coder according to FIG. 3, the coded audio signals LO' and RO' as well as the coding rules CLO and CRO are put together to form a standardized multiplex signal M' intended for stereophonic reproduction, while the matrixing instruction X is put together with the remaining signals Z01', Z02' and Z03' and the associated coding rules CZ01, CZ02 and CZ03 to form a multiplex signal M".

Figure 5:
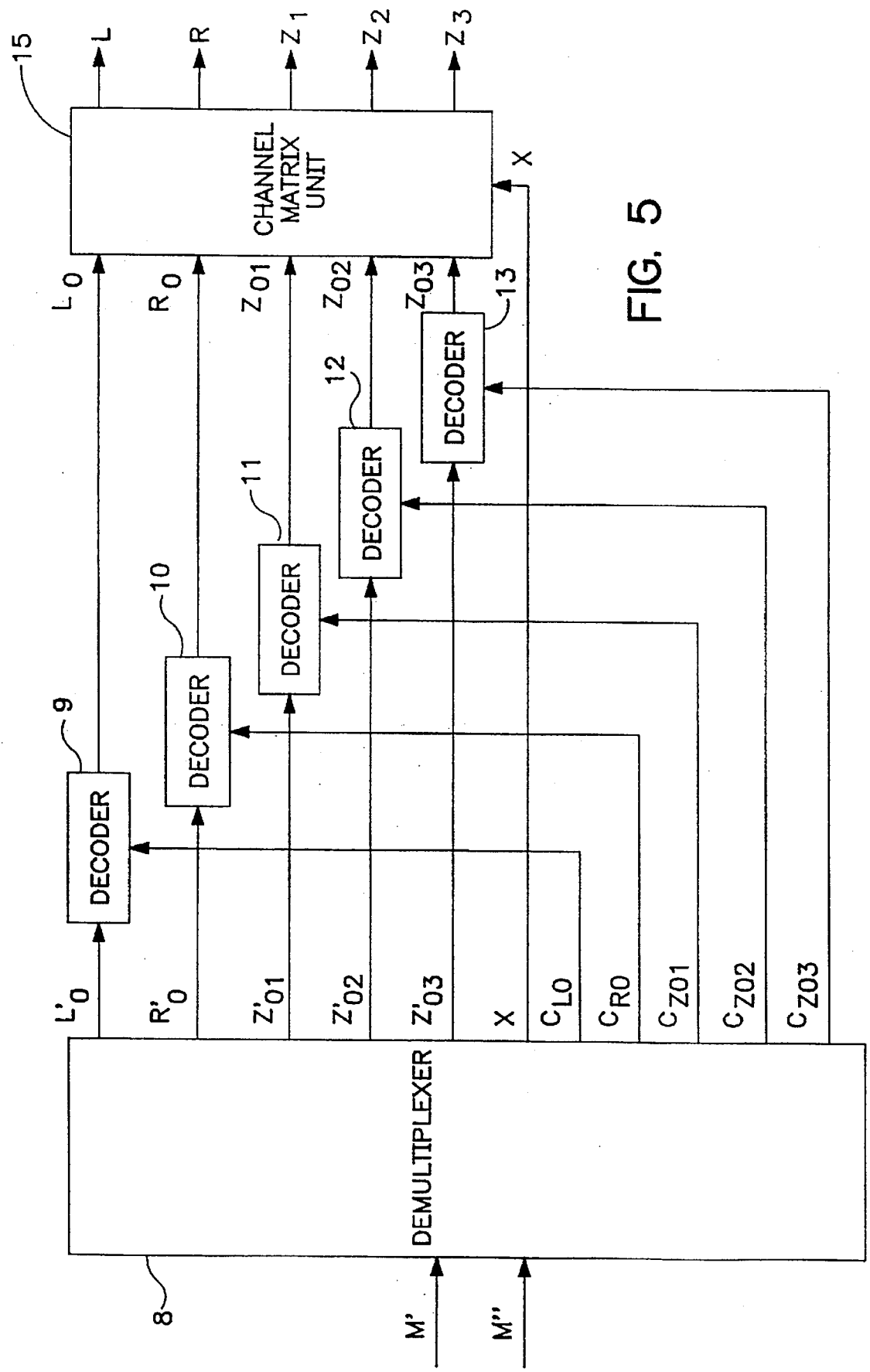
FIG. 5 is a block diagram of a multi-channel source decoder which is suited for both the decoding of the multi-channel audio signals coded by the source coder according to FIG. 3 and the decoding of the stereophonic audio signals coded by known source coders working in according with bit rate-reducing methods.

FIG. 5 illustrates the block diagram of a stereo-compatible, multi-channel source decoder. Here, as opposed to the source decoder in FIG. 2, the channel matrix unit 15 is new which, by using the matrixing instruction X from the audio signals LO and RO intended for stereophonic reproduction, again generates the original audio signals L, R and the audio signals Z1, Z2 and Z3 from the signals Z01, Z02 and Z03, which together can be reproduced in a multi-channel fashion.

The advantages emanating from the method according to the invention are:

In relation to the additional number of channels, only a small additional data rate is necessary for the transmission of the multi-channel audio signal.

The reproduction of audio signals that are transmitted or stored in a multi-channel fashion can take place by means of previously already existing stereophonic receivers. Thus, a downward compatibility of a new multi-channel method with already introduced two-channel methods can be achieved.

For the reproduction of audio signals that are transmitted or stored in a multi-channel fashion by means of previously already existing stereophonic receivers, a dematrixing in the receiver is not necessary. This results in more cost-effective receivers for only stereophonic reproduction.

What I claim is:

1. A method for the transmission or storage of digitized, bit rate-reduced audio signals, characterized in that:

for the bit rate reduction of audio signals having left and right audio channels and at least one further audio channel, psychoacoustic masking by at least a portion of the at least one further audio channel or the redundancy of individual audio channels among themselves is utilized for each individual audio channel, to the effect that only those portions of each audio channel are transmitted or stored that are not masked by the audio signals of other audio channels or are contained in the audio channels for stereophonic reproduction, and the portions of each audio channel that are transmitted or stored are transmitted or stored with such low resolution that the quantization noise generated by quantization remains masked by the totality of all audio channels, wherein the left and right audio channels are matrixed with the at least one further audio channel so as to create a stereo-compatible left channel and right channel, the maskings being computed for multi-channel reproduction and for stereophonic reproduction, of which a respectively lower masking is used for the coding of the stereo-compatible left channel and right channel as well as of the at least one further audio channel.

2. A method according to claim 1, wherein the at least one further audio channel comprises a plurality of further audio channels, wherein at least one of the further audio channels is matrixed in such a way that the information portions contained therein, which are also contained in the stereo-compatible left channel and right channel, are entirely or partially removed by matrixing before coding or after partial coding, and wherein information regarding the matrixing is added to the coded audio signals for subsequent use during a corresponding dematrixing when the multi-channel audio signal is decoded and reproduced.

3. A method according to claim 1, wherein for the transmission and storage, a multiplex signal is formed from the stereo-compatible left channel and right channel which corresponds to a known and standardized multiplex signal for two-channel, coded audio signals, and wherein the coded data of the at least one further audio channel is transmitted or stored in a separate multiplex signal.

4. A method for processing digitized audio signals for subsequent transmission or storage, the audio signals having left and right audio channels and a plurality of further audio channels, said method comprising the steps of:

(a) matrixing at least some of the audio channels, step (a) including matrixing the left and right audio channels with the further audio channels so as to create stereo-compatible left and right audio channels; and (b) utilizing psychoacoustic masking to reduce the bit rate of the audio channels, step (b) being conducted so that only those portions of each audio channel are transmitted or stored which are not masked by the audio signals of other audio channels, and so that the portions of each audio channel which are transmitted or stored have a low resolution with quantization noise being masked, wherein the maskings are computed for multi-channel reproduction and for stereophonic reproduction.

5. The method of claim 4, wherein step (b) comprises generating a plurality of coding rules, and further comprising the step of multiplexing the bit-rate-reduced audio channels and the coding rules prior to transmission or storage.

6. The method of claim 5, wherein the step of multiplexing further includes multiplexing information regarding the matrixing conducted in step (a), along with the bit-rate-reduced audio channels and the coding rules.

7. The method of claim 6, wherein step (a) further includes matrixing at least one of the further audio channels in such a way that portions of information contained therein are removed.

8. The method of claim 4, wherein step (a) further includes matrixing at least one of the further audio channels in such a way that portions of information contained therein are removed.

* * * * *